Patented Aug. 18, 1925.

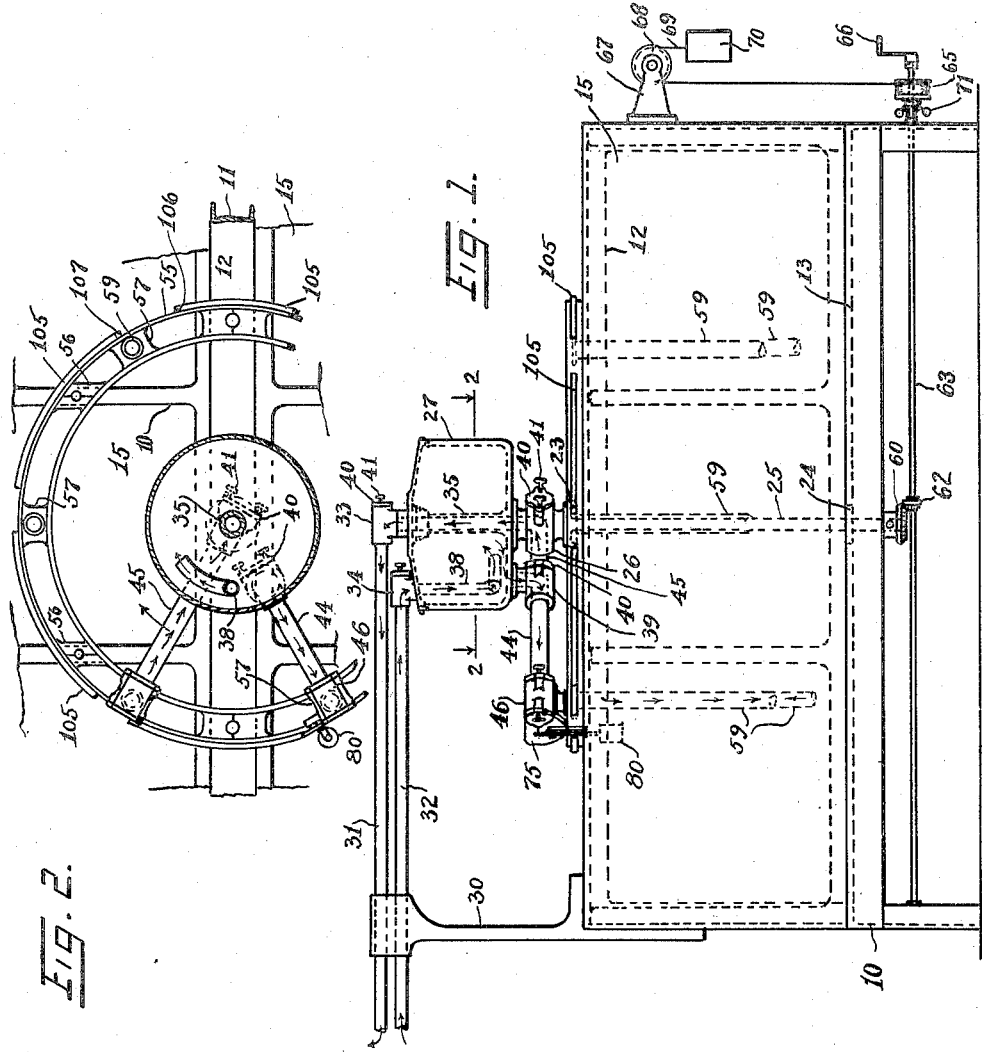

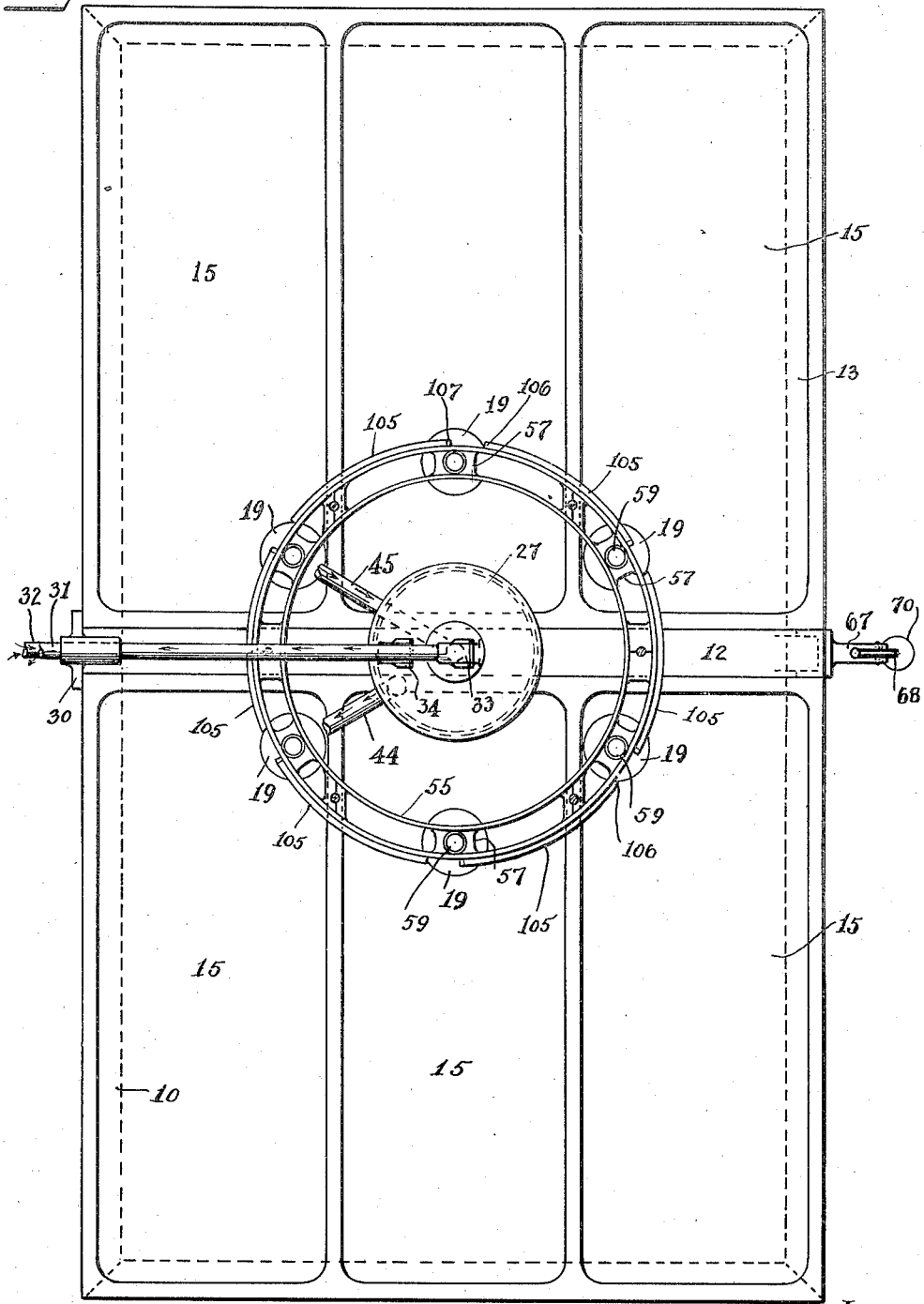

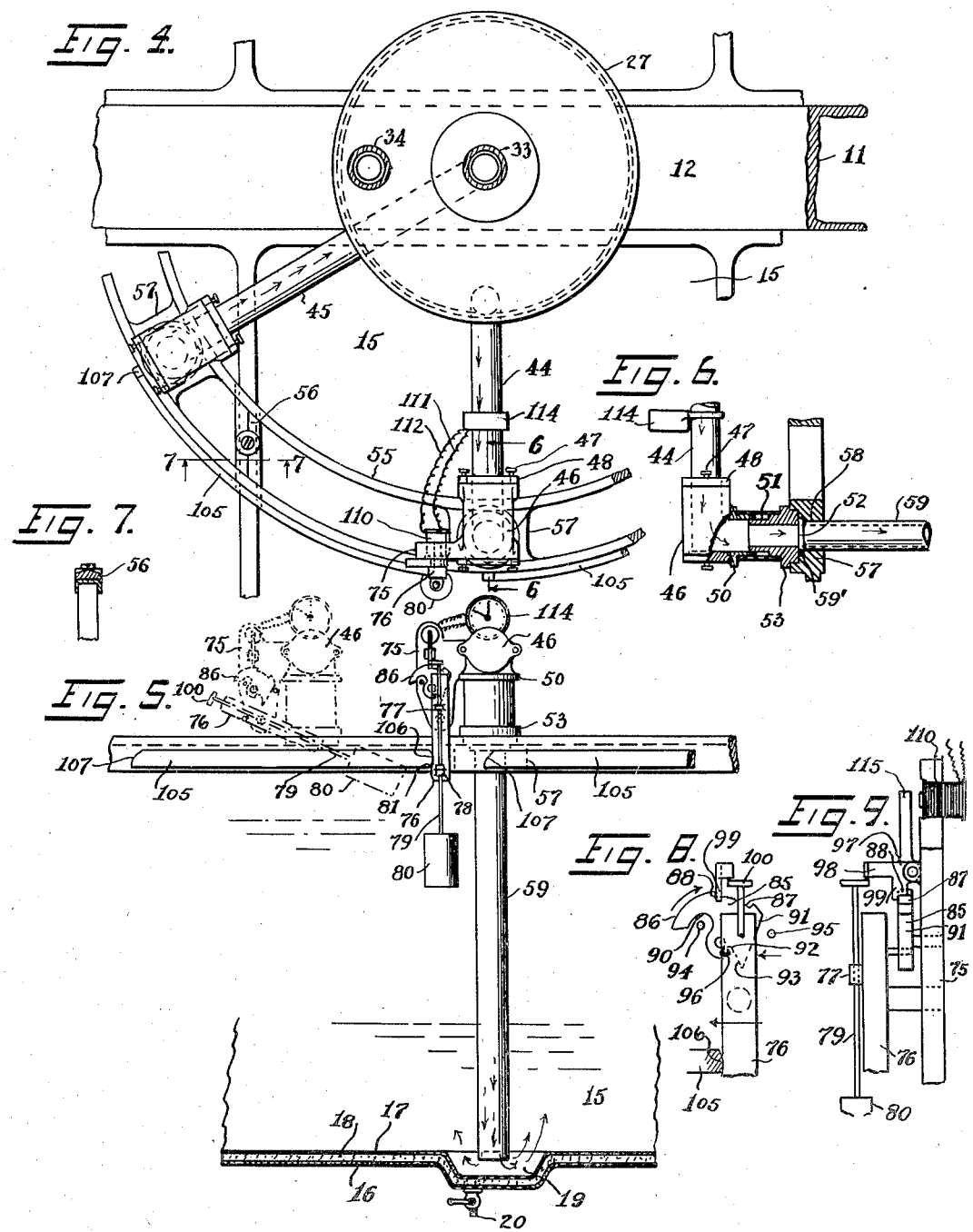

1,550,196

UNITED STATES PATENT OFFICE.

EMIL BEHRINGER, OF BROOKLYN, NEW YORK.

MILK-HOLDING APPARATUS.

Application filed July 5, 1923. Serial No. 649,666.

*To all whom it may concern:*

Be it known that I, EMIL BEHRINGER, a citizen of the United States, residing in Brooklyn, in the county of Kings and State of New York, have invented certain new and useful Improvements in Milk-Holding Apparatus, of which the following is a specification.

This invention relates to machines for holding milk a predetermined period of time, and is associated with pasteurizers and is designed so that milk runs from the pasteurizer into this holder, thereby to cause the milk to be held in said holder any predetermined period of time so that the milk may be easily maintained at the outgoing temperature of the milk from the pasteurizer to said holder, thereby to complete the pasteurization of the milk through holding the same a predetermined period of time and at predetermined temperatures.

In addition thereto this invention contemplates, through the introduction of proper insulations and materials in the holder, the provisions of means which permits the milk to be held in the holder during said predetermined periods without any appreciable loss of heat.

One object of the construction herein to be set forth, relates to the manner in which the filling and emptying pipes are contained within the body of the holder and are removable therefrom only for cleaning, and owing to this construction, the pipes therefore retain their heat and are more sanitary on account of not having to be removed from the said tanks after each filling and emptying.

Another object of the invention is to so handle the milk, that an auxiliary reservoir between the pasteurizer and the milk holder is created, thereby creating an extra reservoir supply of milk for filling and through which all of the milk from the pasteurizer passes. At the same time, this reservoir container is so constructed that the milk entering therein is given a centrifugal or tangential action causing it to flow around the axis of said tank thereby obviating the creation of foam upon the milk and thereby permitting the tanks to be filled to their full capacity without allowance for foam, which might otherwise occur.

Another object of the invention is to provide an apparatus or device of this kind for automatically filling and emptying the milk tanks.

Another object of the invention is to provide an apparatus or device of this kind for automatically timing the pasteurizing or holding process.

Another object of the invention is to provide an apparatus or device of this kind which is easily set up and cleanable.

Other objects of the invention are to improve generally the simplicity and efficiency of such devices and to provide a device or apparatus of this kind which is durable, economical to manufacture, assemble and operate and which will not get out of order.

The inventive features for the accomplishment of these and other objects are herein shown in connection with an improved milk holding machine which, briefly stated, comprises a plurality of tanks arranged around a rotary coupling carrying a chamber mounted thereon. Outlet and inlet pipes for the milk communicate respectively with said coupling and chamber, and radial filling and suction pipes are supported by and communicate with said chamber and coupling, and are provided with down turned outer ends. An annular track coaxial with said chamber is disposed on the tanks and provided with connecting ties and connecting webs, each web being provided with an opening receiving vertical filling and discharge pipes disposed in the respective openings. Means are provided to revolve said radial pipes around to bring said down turned ends in successive communications with adjacent vertical pipes; and there is a float and electrically controlled escapement means for stopping said radial pipes in said communications and releasing the pipes when a tank is filled by the filling pipe.

Other objects of the invention will appear as the description proceeds; and while herein details of the invention are described, the invention, is not limited to these, since many and various changes may be made without departing from the scope of the invention as claimed.

In the accompanying drawing, showing by way of example, one of many possible embodiments of the invention, Fig. 1 is an end elevation of the machine;

Fig. 2 is a sectional view, partly in plan, taken on the line 2—2 of Fig. 1, looking in the direction of the arrow of said line;

Fig. 3 is a plan showing the assembled machine;

Fig. 4 is a fragmental plan showing the chamber and adjacent parts on a larger scale;

Fig. 5 is a fragmental side elevation showing the location of the escapement means;

Fig. 6 is a longitudinal vertical sectional view, partly in elevation of the down turned outer ends of the radial pipes, taken on the line 6—6 of Fig. 4 looking in the direction of the arrow of said line;

Fig. 7 is a transverse vertical sectional view, taken on the line 7—7 of Fig. 4 looking in the direction of the arrow of said line;

Fig. 8 is a fragmental side elevation showing the escapement means on a larger scale; and Fig. 9 is a fragmental front elevation showing the escapement means.

A rectangular table support 10 (Fig. 1) provided at its mid part with an upright rectangular transverse frame 11 (Fig. 2) comprising end pieces and upper and lower horizontal webbed bars 12 and 13, carries a plurality of horizontal elongated rectangular tanks 15 arranged in groups of three with their ends abutting said frame 11. Each of the tanks comprises outer and inner metallic plates 16 and 17 (Fig. 5) with a heat insulating material 18 disposed between said plates; and the bottom of each tank being provided with a depression forming a basin 19 provided with a drain cock 20.

Upper and lower bearings 23 and 24 (Fig. 1) mounted at the mid part of said bars 12 carry a rotary vertical shaft 25 on the upper end of which is mounted an inverted T-shaped cleanable pipe coupling or T 26 carrying a surge chamber 27 coaxial therewith and with said shaft. An end bracket 30 mounted on one end of said upper cross piece is provided with upper and lower horizontal bores carrying outlet and inlet pipes 31 and 32 for the milk having their inner ends disposed over said surge chamber and their outer ends connected to suitable pump and supply means, not shown. Connecting T's 33 and 34 each have one cross arm received on the inner ends of said pipes respectively. The T 33 of the outlet pipe is disposed coaxial with the surge chamber and communicates with an axial pipe 35 disposed axially of the surge chamber and communicating with said coupling 26. A discharge pipe 38 communicating with the inlet T 34 discharges forwardly in the lower part of the surge chamber, which in turn discharges into an inverted bracket T 39 mounted on the lower face of the surge chamber.

Removable plates 40 clamped on the outer arm of each said T-s by means of clamping screws 41, whereby when the plate is removed, the T's and the pipes connecting therewith may be cleaned.

Radial filling and suction pipes 44 and 45 (Fig. 4) received and supported in said bracket T 39 and said T coupling 26 are disposed 60 degrees apart, and have their outer ends adapted to be successively disposed over respective adjacent tanks as the vertical shaft is rotated step by step, as will be explained. Removable T's 46 (Fig. 6) on the ends of said pipes 44 and 45 are secured by headed screws 47 to end collars 48 fast on the outer ends of the radial pipes. Each of said T's has a downwardly disposed body portion to which is secured an outer telescopic member 50 receiving an inner telescope member 51 provided at the lower end with a circular contact face 52 and an annular flange 53. A flexible rubber casing is disposed around said telescoping members to permit relative longitudinal movement therebetween.

An annular two-rail track 55 (Figs. 2 and 4) coaxial with said shaft is provided with roof shape milk diverting ties 56 (Fig. 7) disposed on and secured to said upper bar 12 and the upper edges of the walls of the tanks. Said track is also provided between the rails with connecting webs 57 each provided with a countersunk opening 58 (Fig. 6). Said webs 57 form equidistant filling and discharge stations disposed 60 degrees apart, the openings 58 of adjacent webs being adapted to register with both of said circular contact faces 52 at the same time. A filling and discharge pipe 59 disposed in each of said openings respectively and each has an upper end flange 59' resting in the countersink of the opening. The lower end of said pipes extend into said basins 19 below the main level of the bottom of the tanks. The vertical shaft 25 (Fig. 1) is rotated by a bevel gear 60 mounted on its lower end and itself rotated by a bevel pinion 62 engaging said bevel gear and carried on a horizontal drive shaft 63 rotatably mounted in the lower part of said end members of the frame 11. A drum 65 and a winding crank 66 are mounted on one outer end of said horizontal shaft. A bracket 67 above said drum carries a pulley 68 in turn carrying a flexible means 69 wound around said drum and disposed over said pulley and carrying a weight 70, whereby when said flexible means is wound up on the drum, said weight tends to revolve said radial pipes 44 and 45 around from station to station. A governor 71 disposed on said driving shaft controls the speed thereof.

An escapement bracket 75 (Figs. 4 and 5) formed on the T of the tank filling radial pipe 44 carries a vertical float rod or escapement lever 76 intermediately fulcrumed on said escapement bracket and provided with upper and lower guide lugs 77 and 78 receiving a float rod 79 guided in said lug and carrying a float 80 at its lower end. A collar 81 fastened on said rod between said lugs limits the downward movement of the rod. A dog 85 (Fig. 8) intermediately fulcrumed on said bracket near the upper end of the float rod lever is provided with an upper coaxial arcuate peripheral face 86 provided with an arcuate slot 87 forming a detent shoulder 88. The lower part of said dog is provided with front and rear stop faces 90 and 91, a retaining notch 92 and a guide face 93 leading to the retaining notch. Stop pins 94 and 95 mounted on said bracket and engageable with said faces limit the pivotal movement of the dog. A latch pin 96 engageable with said guide face 93 when the lever is moving to vertical position engages in said retaining notch 92 after the lever is in vertical position. A pivoted latch 97 Fig. 9, having an elbow part fulcrumed on said escapement bracket is provided with a horizontal lifting arm 98 and a downwardly pointing detent arm 99 engageable against said detent shoulder 88, to hold said dog against pivotal movement and the release of said latch pin 96 from the retaining notch 92. A lifting plate 100 secured on the upper end of said float rod 79 is engageable under said lifting arm 98 for releasing the dog and said latch pin.

When the escapement lever is locked by the dog in vertical position, the radial pipes are held in registration with adjacent vertical pipes 59 by engagement of the float rod lever against arcuate cam track members 105 (Fig. 5) mounted on the outer face of the outer rail of the track 55 and provided with rounded abutment ends 106 engageable with said float rod lever to hold said radial pipes in filling and discharge position and adapted to tilt and guide the float rod lever as the radial pipes revolve. Said cam track members are also provided with bevelled release ends 107 for releasing the float rod lever when said end is reached to permit the lever to assume vertical position and again stop the radial pipes in operative position. A solenoid 110 mounted in the upper end of the escapement bracket is connected by wires 111 and 112 to an electric impulse clock 114 (Fig. 4) connected to or containing a suitable current source and having contact means adapted to send short electrical impulses to said wires at regular intervals, for instance, at five minute intervals. An armature 115 (Fig. 9) attractable by the solenoid and fast on said latch 97 at the outer face of said escapement bracket, whereby when the solenoid is energized, the latch is raised to release the escapement lever, whereupon the escapement lever is released in the same manner as if it had been raised by the float.

Said solenoid and electrical impulse clock serve to time the movement of the radial tubes, should the filling of the tank be too slow; while the float 80 serves to time the filling and prevent the overflow of the tank should the filling take place too fast or the electrical device fail to operate on time or at all.

The operation of the device is simple and obvious from the foregoing. The apparatus can be operated with either the float or the clock or both.

The milk is to remain in the tanks a predetermined length of time, for example, thirty minutes. The clock will be set to give impulses every five minutes, and the inlet and discharge pumps or other means will be adjusted to fill and empty each respective tank in about that time.

While the held milk is being withdrawn from one tank, the uncooled milk is being fed to the tank immediately behind it. As the filling becomes complete, the clock sends an impulse, thus raising the latch 97, permitting the escapement lever 76 to swing and the radial pipes to move forward to the next tank, the discharge pipe 45 moving to a full tank, while the filling pipe 44 moves to the tank that was just emptied. When this takes place, the escapement lever falls and becomes again locked; and the operation is repeated until all of the series has been refilled, whereupon the operation is continued as long as desired.

As the filling of each tank requires a certain length of time (say, five minutes), it will require six times that long for the series to be refilled and the milk in each tank has about that length of time to cool and pasteurize. If a different time is required, either the inflow and outflow of the milk or the impulse period of the clock, or both, are changed accordingly.

If the clock or the float is used alone, the action is the same, as the latch is lifted in either case.

I claim as my invention:

1. In combination, a plurality of tanks; a rotary member comprising filling and suction conduits having their outer ends one in advance of the other; means to revolve said conduits to bring said ends in successive communications with the respective tanks; and means on the filling radial pipe for stopping said radial conduits in said communications and releasing the conduits when a tank is filled.

2. In combination, a plurality of tanks; a rotary coupling; a chamber mounted on said coupling; outlet and inlet pipes communicating respectively with said coupling and chamber; radial filling and suction pipes supported by and communicating with said chamber and coupling, and having the down turned outer ends disposed over adjacent tanks; vertical filling and discharge pipes disposed in the respective tanks; and means for stopping the radial filling means in communication with the vertical pipe of an empty tank and advancing it to the next pipe when the tank is filled.

3. In combination, a plurality of tanks; a vertical rotary shaft; a coupling on said shaft; a chamber mounted on said coupling; outlet and inlet pipes having their inner ends disposed over and communicating respectively with coupling and said chamber; radial filling and suction pipes supported by and communicating with said chamber and coupling and having their outer ends down turned and provided with contact faces; plates disposed over the respective tanks; vertical filling and discharge pipes disposed in said plates; and means to revolve said shaft and radial pipes around from plate to plate.

4. In combination, a plurality of tanks; a rotary coupling; a chamber mounted on said coupling; outlet and inlet pipes communicating respectively with said coupling and chamber; radial filling and suction pipes supported by and communicating with said chamber and coupling, and having the down turned outer ends; vertical filling and discharge pipes disposed in the respective tanks; means to revolve said radial pipes around to bring said down turned ends in successive communications with adjacent vertical pipes; an escapement means on the filling radial pipe for stopping said radial pipes in said communications and releasing the pipes when a tank is filled by the filling means.

5. In combination, a rectangular table support provided at its mid part with an upright transverse frame comprising end pieces and upper and lower horizontal webs; the horizontal elongated rectangular tanks disposed on said support and arranged in groups of three with their ends abutting said frame; a rotary vertical shaft mounted centrally of said webs; filling and discharge means carried on said shaft for successively filling the tanks and for drawing liquid from the tank is advance of the one being filled; and means for stopping the filling means in communication with an empty tank and advancing it when that tank is filled.

6. In combination, a tank provided with depressed basins in its floor; a conduit terminating in said basin; and radially disposed filling and suction means entering into successive communication with the said conduit.

7. In a device of the class described, the combination with a plurality of containers, of depressed basins in the floor thereof, movable pipes disposed above and depending into said containers, the said pipes terminating in said basins, and a rotary member having radially disposed filling and suction conduits for communicating successively with the respective pipes.

8. In combination, a plurality of tanks provided with depressed basins in their floors; vertical pipes in said tanks terminating in said basins; a rotary member comprising filling and suction conduits having their outer ends one in advance of the other; and means to revolve said conduits to bring and stop said ends in successive communication with the respective vertical pipes.

9. In combination, a plurality of tanks; filling means for successively filling the tanks; means for drawing liquid from the tank in advance of the one being filled; and electrically controlled means for stopping the filling means in communication with the empty tank and advancing it when the tank is filled.

10. In combination, a plurality of tanks; filling means for successively filling the tanks; means for drawing liquid from the tank in advance of the one being filled; and electrically and float controlled means for stopping the filling means in communication with the empty tank and advancing it when the tank is filled.

11. In combination, a plurality of tanks; filling means for successively filling the tanks; means for drawing liquid from the tank in advance of the one being filled; and liquid level control means and clock controlled electrical means for stopping the filling means in communication with the empty tank and advancing it when the tank is filled.

12. In combination, a plurality of tanks; a revoluble member comprising filling means for successively filling the tanks; and means for drawing liquid from the tanks; an escapement bracket carried by said member; a lever fulcrumed on said bracket; a float rod guided on said bracket; a float carried by said rod; a dog for holding the lever in vertical position; a pivoted latch for holding the dog in operative position and engageable by said float rod being for releasing the dog; and arcuate cam track members engageable by said levers to hold said member in filling and discharge position and adapted to tilt and guide the lever as said member revolves; and clock-work controlled electrical means for raising said latch to release the dog.

13. In combination, a plurality of tanks; filling means for successively filling the tanks; and float means for stopping the filling and advancing the filling means to the tank next to be filled.

14. In combination, a plurality of tanks;

filling means for successively filling the tanks; means for drawing liquid from the tank in advance of the one being filled; and float controlled means for stopping the filling means in communication with the empty tank and advancing it when the tank is filled.

15. In combination, a plurality of tanks; means for drawing liquid from the tank in advance of the one being filled; and escapement means controlled by the filling of the tank, means for stopping the drawing means in communication with a full tank and advancing it when the tank is empty.

16. In combination, a plurality of tanks; filling pipes for successively filling the tanks; radial pipes for drawing liquid from the tank in advance of the one being filled; means to revolve said radial pipes around from tank to tank; an escapement bracket on the filling radial pipe; a lever fulcrumed on said bracket; a float rod guided on said bracket; a float carried by said rod; a dog for holding the lever in vertical position; a pivoted latch for holding the dog in operative position and engageable by said float rod for releasing the dog; and arcuate cam track members engageable by said lever to hold said radial pipes in filling and discharge position and adapted to tilt and guide the float rod lever as the radial pipes revolve, said cam track members being adapted for releasing the float rod lever when said lever passes to permit the lever to assume vertical position.

17. In a device of the class described, the combination with a plurality of containers, of a circular support having segments thereof above and adjacent each of said containers, removable pipes mounted on said support and depending into each of said containers, and a plurality of radial conduits for simultaneously and successively emptying and filling said containers upon communication with said pipes.

18. In a device of the class described, the combination with a plurality of tanks, the walls of which contain insulating means therebetween, of removable filling and discharging pipes, positioned therein, said pipes being under cover whereby to conserve their latent heat, and rotating conduits for communicating with successive pipes to simultaneously empty and fill respective tanks containing said pipes.

19. In a device of the class described, the combination with a plurality of insulated fluid containers of a trackway over said containers removable filling and discharging pipes passing through said trackway into the containers, said pipes being under cover whereby to conserve their latent heat, and rotating conduits for communicating with successive pipes to simultaneously empty and fill respective containers.

20. In a device of the class described, the combination with a plurality of containers, of rotating conduits for filling and discharging successive containers, latch means for retaining the conduits in position over successive containers, means for releasing the conduits at a predetermined time, and a governor for controlling the rate of rotation of said conduits to the subsequent positions.

21. In a device of the class described, the combination with a plurality of containers of rotating conduits for filling or discharging the said containers, latch means for retaining the conduits in position over successive containers, and a governor for controlling the rotation of the said conduits upon release of the latch means therefrom.

22. In a device of the class described, the combination with a plurality of containers, of a filling chamber positioned above said container, discharge and filling conduits connected thereto, and means for rotating the filling chamber whereby to subject the incoming fluid to a centrifugal motion.

23. In a device of the class described, the combination with a plurality of containers, of a filling chamber positioned above said container, discharge and filling conduits connected thereto, and means for subjecting the fluid contained in said chamber to a centrifugal action whereby to prevent frothing thereof.

24. In a device of the class described, the combination with a plurality of containers of a filling chamber in communication therewith, and means for subjecting the fluid contained in said chamber to a centrifugal action thereby to prevent frothing thereof.

EMIL BEHRINGER.